(12) United States Patent
Holt et al.

(10) Patent No.: US 10,452,229 B2
(45) Date of Patent: Oct. 22, 2019

(54) TECHNIQUES FOR SELECTING LIST ITEMS USING A SWIPING GESTURE

(71) Applicant: Citrix Systems, Inc., Fort Lauderdale, FL (US)

(72) Inventors: David Holt, Raleigh, NC (US); Caroline Ford, Raleigh, NC (US); Andrew George Wirtanen, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1190 days.

(21) Appl. No.: 14/605,178

(22) Filed: Jan. 26, 2015

(65) Prior Publication Data

US 2015/0212704 A1 Jul. 30, 2015

Related U.S. Application Data

(60) Provisional application No. 61/987,220, filed on May 1, 2014, provisional application No. 61/931,210, filed on Jan. 24, 2014.

(51) Int. Cl.
*G06F 3/0482* (2013.01)
*G06F 3/0484* (2013.01)
*G06F 3/0488* (2013.01)

(52) U.S. Cl.
CPC ........ *G06F 3/0482* (2013.01); *G06F 3/04842* (2013.01); *G06F 3/04883* (2013.01)

(58) Field of Classification Search
CPC . G06F 3/0482; G06F 3/04883; G06F 3/04842

USPC ....................................................... 715/817
See application file for complete search history.

(56) References Cited

U.S. PATENT DOCUMENTS

| | | | | |
|---|---|---|---|---|
| 5,594,847 A * | 1/1997 | Moursund | ........... | G06F 3/04842 345/645 |
| 5,848,187 A * | 12/1998 | Bricklin | ................ | G06F 17/211 382/187 |
| 7,036,091 B1 * | 4/2006 | Nguyen | ................ | G06F 3/0482 348/E5.002 |
| 8,255,830 B2 * | 8/2012 | Ording | ................... | G06F 1/1626 715/810 |
| 9,176,657 B2 * | 11/2015 | Tumwattana | ......... | G06F 3/0485 |
| 9,377,925 B2 | 6/2016 | Anderson et al. | | |
| 2008/0170781 A1 * | 7/2008 | Woolgar | ............. | G06F 3/04845 382/173 |
| 2009/0174680 A1 * | 7/2009 | Anzures | ................ | G06F 1/1626 345/173 |
| 2010/0031295 A1 * | 2/2010 | Krzyzanowski | .... | H04L 12/2816 725/52 |

(Continued)

*Primary Examiner* — Ryan F Pitaro
*Assistant Examiner* — Henry Orr
(74) *Attorney, Agent, or Firm* — BainwoodHuang

(57) ABSTRACT

A method performed by a computing device of selecting one or more items from a list displayed on a touch screen of the computing device. The method includes receiving touch commands indicating swiping motions performed by a user on the touch screen. These touch commands result in tentative selection of a list entry, followed by selection of the list entry and possibly tentative selection of adjacent list entries. These may be followed by further touch commands indicating continuing swiping motion to further tentatively or non-tentatively select proximate items.

18 Claims, 16 Drawing Sheets

(56) References Cited

U.S. PATENT DOCUMENTS

| | | | |
|---|---|---|---|
| 2010/0107099 A1* | 4/2010 | Frazier | G06F 3/044 |
| | | | 715/765 |
| 2012/0030566 A1* | 2/2012 | Victor | G06F 3/0482 |
| | | | 715/702 |
| 2012/0151401 A1* | 6/2012 | Hwang | G06F 3/04847 |
| | | | 715/771 |
| 2012/0218190 A1* | 8/2012 | Pechanec | G06F 3/0416 |
| | | | 345/173 |
| 2013/0016103 A1* | 1/2013 | Gossweiler, III et al. | |
| | | | G06K 9/00261 |
| | | | 345/428 |
| 2013/0097526 A1* | 4/2013 | Stovicek | G06Q 10/107 |
| | | | 715/752 |
| 2013/0227031 A1* | 8/2013 | Wells | H04L 51/28 |
| | | | 709/206 |
| 2013/0227413 A1* | 8/2013 | Thorsander | G06F 3/0482 |
| | | | 715/716 |
| 2013/0227470 A1* | 8/2013 | Thorsander | G06F 3/04883 |
| | | | 715/790 |
| 2013/0227490 A1* | 8/2013 | Thorsander | G06F 3/0482 |
| | | | 715/841 |
| 2014/0053102 A1* | 2/2014 | Lee | G06F 3/0482 |
| | | | 715/810 |
| 2014/0282254 A1* | 9/2014 | Feiereisen | G06F 3/04842 |
| | | | 715/835 |
| 2015/0212667 A1 | 7/2015 | Holt et al. | |
| 2015/0350143 A1* | 12/2015 | Yang | G06F 3/0482 |
| | | | 345/173 |
| 2016/0034142 A1* | 2/2016 | Liang | G06F 3/04842 |
| | | | 715/822 |

\* cited by examiner

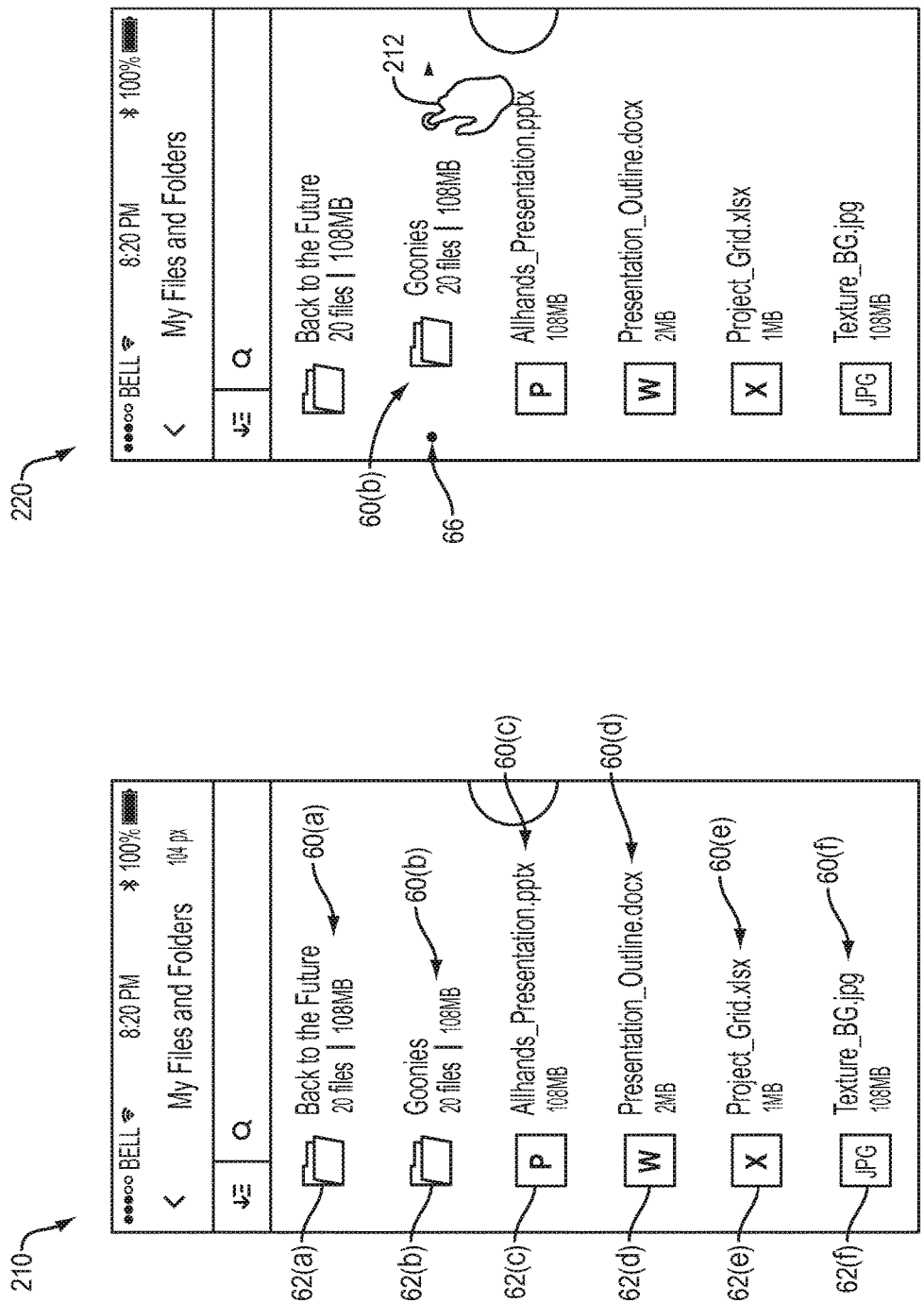

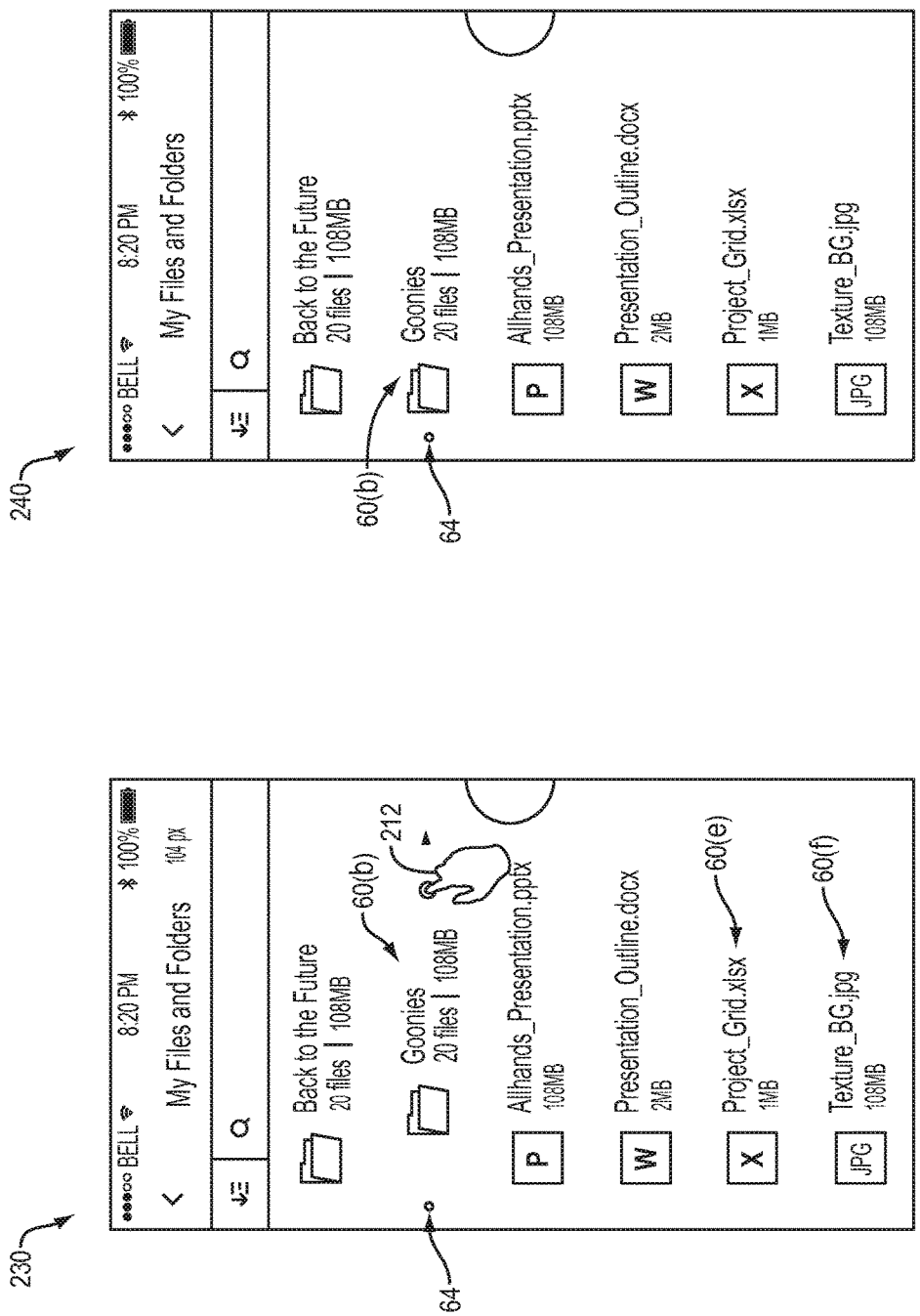

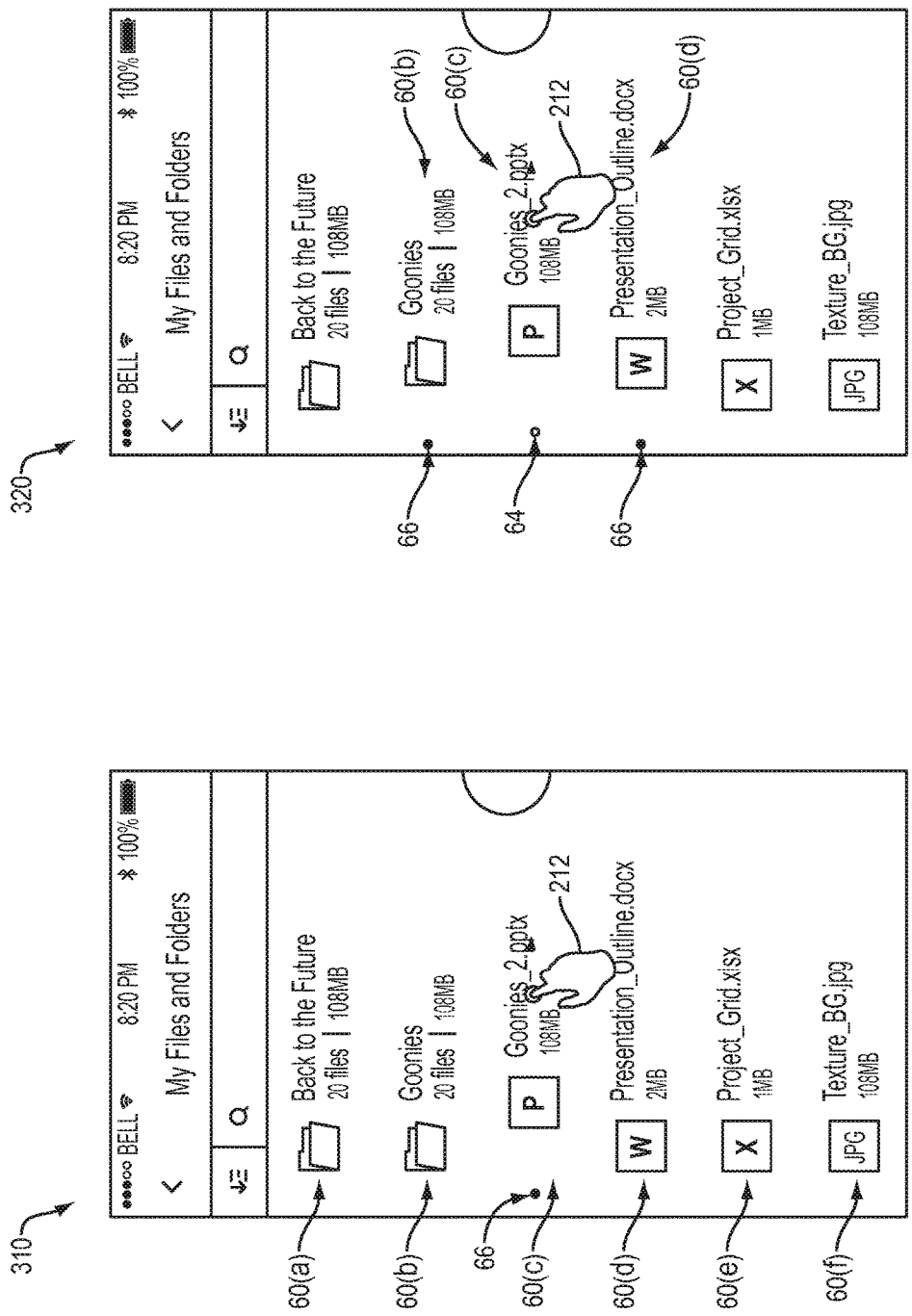

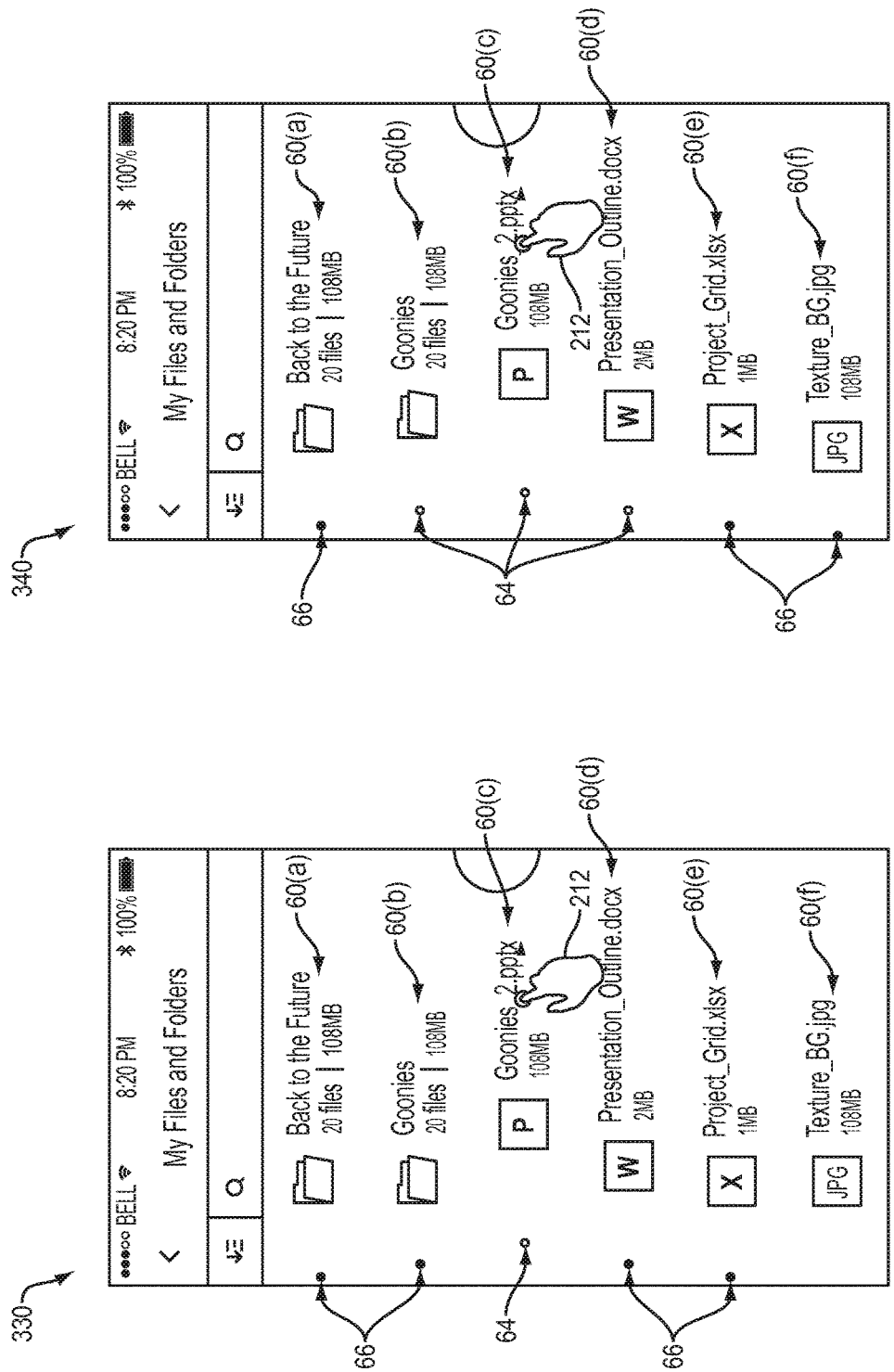

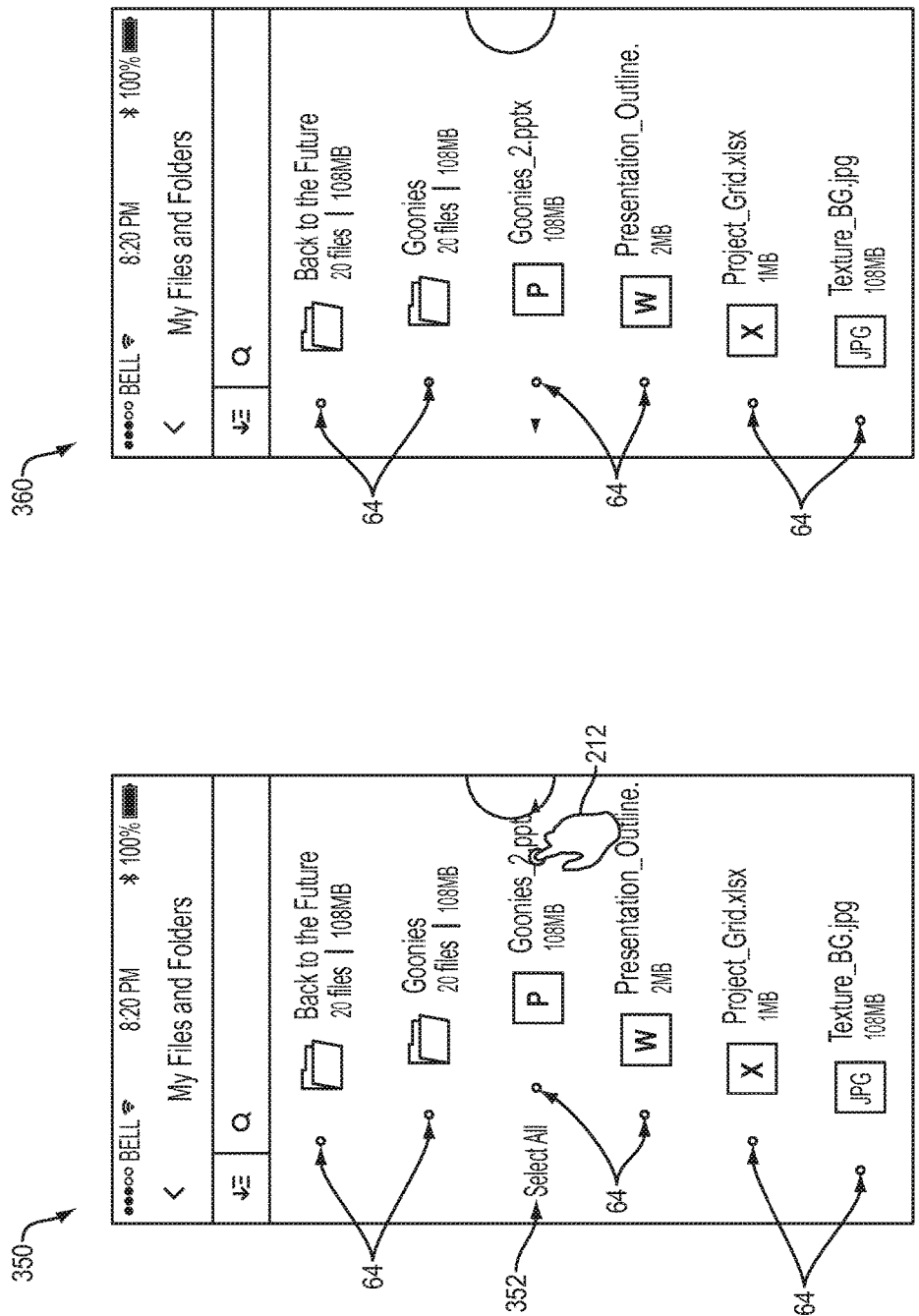

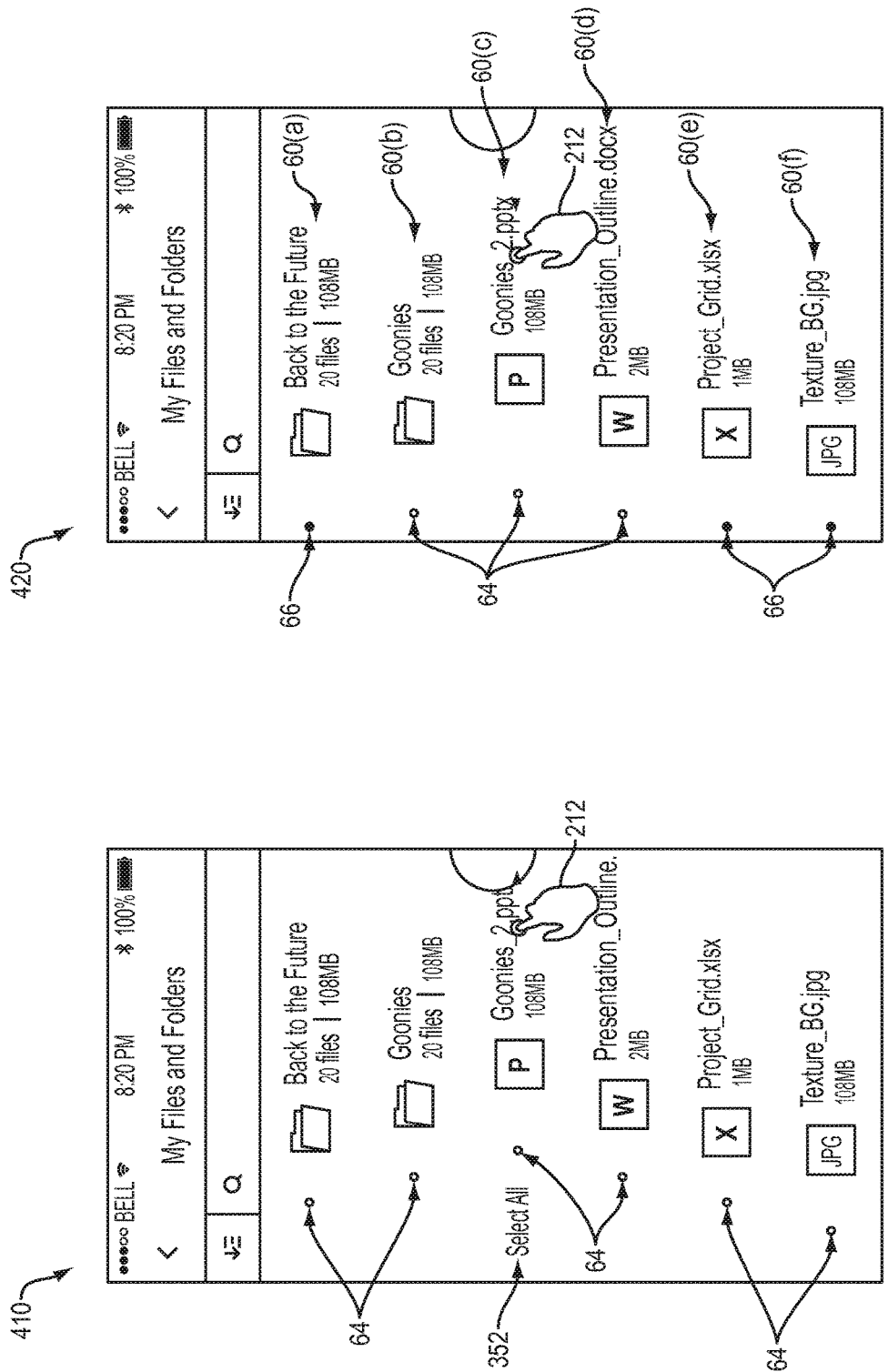

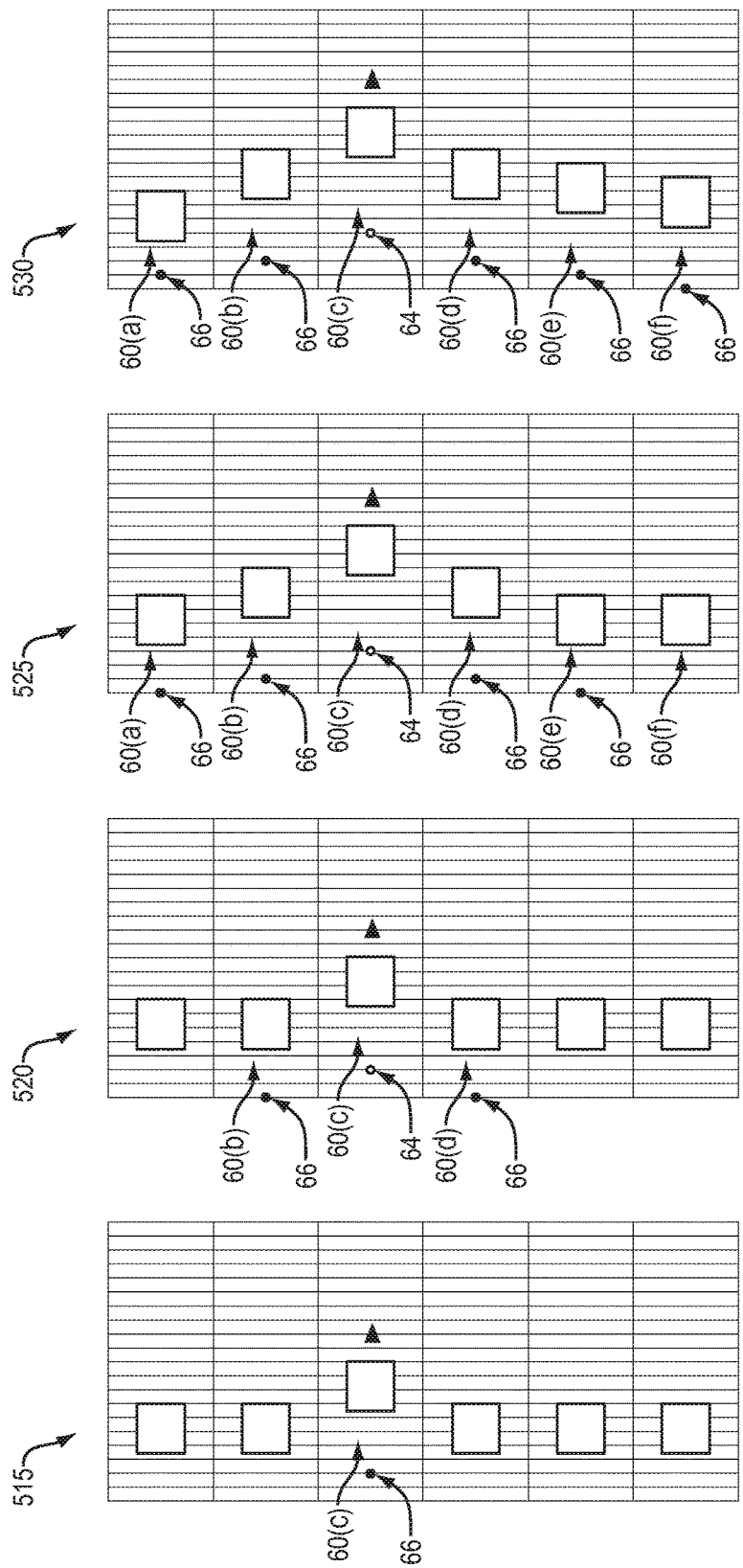

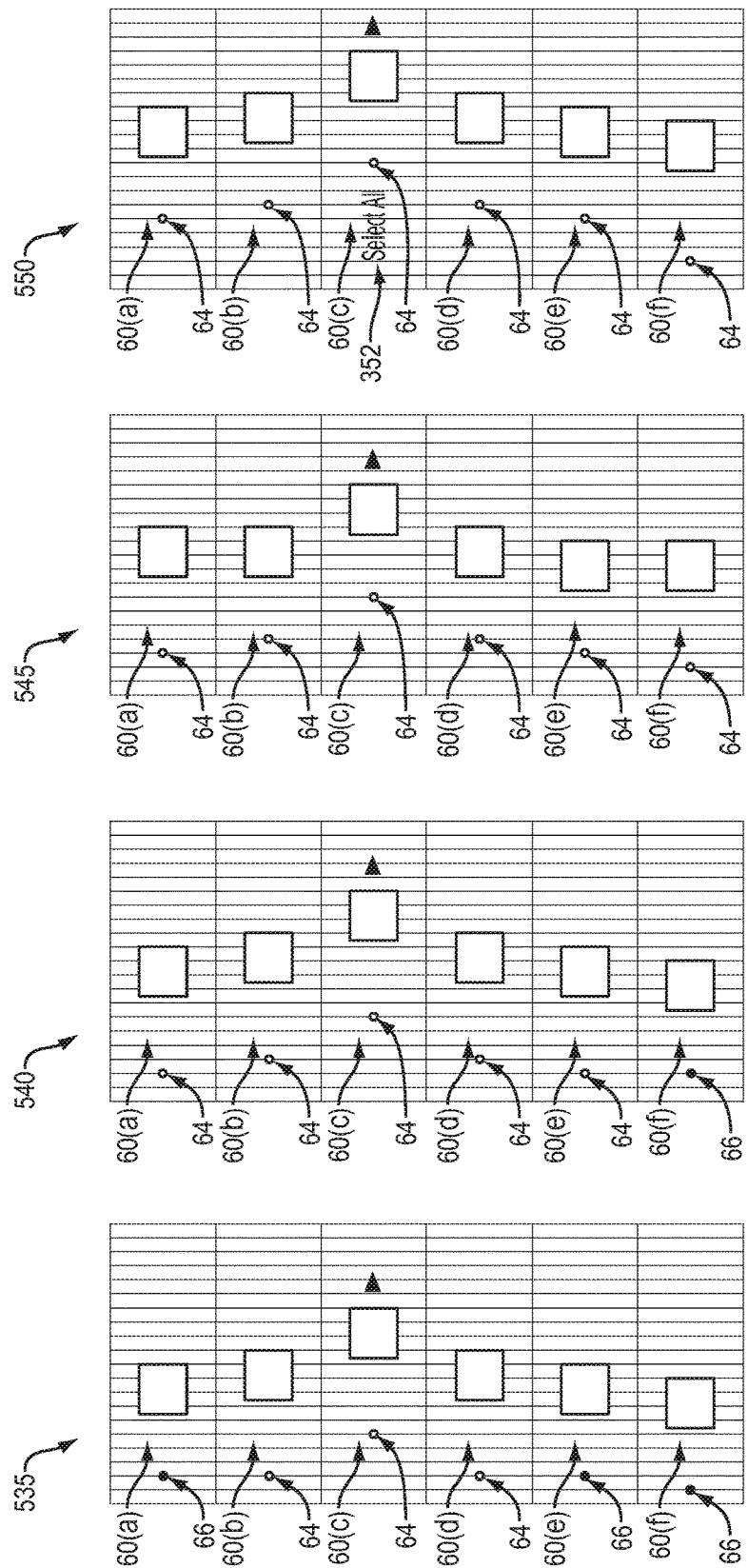

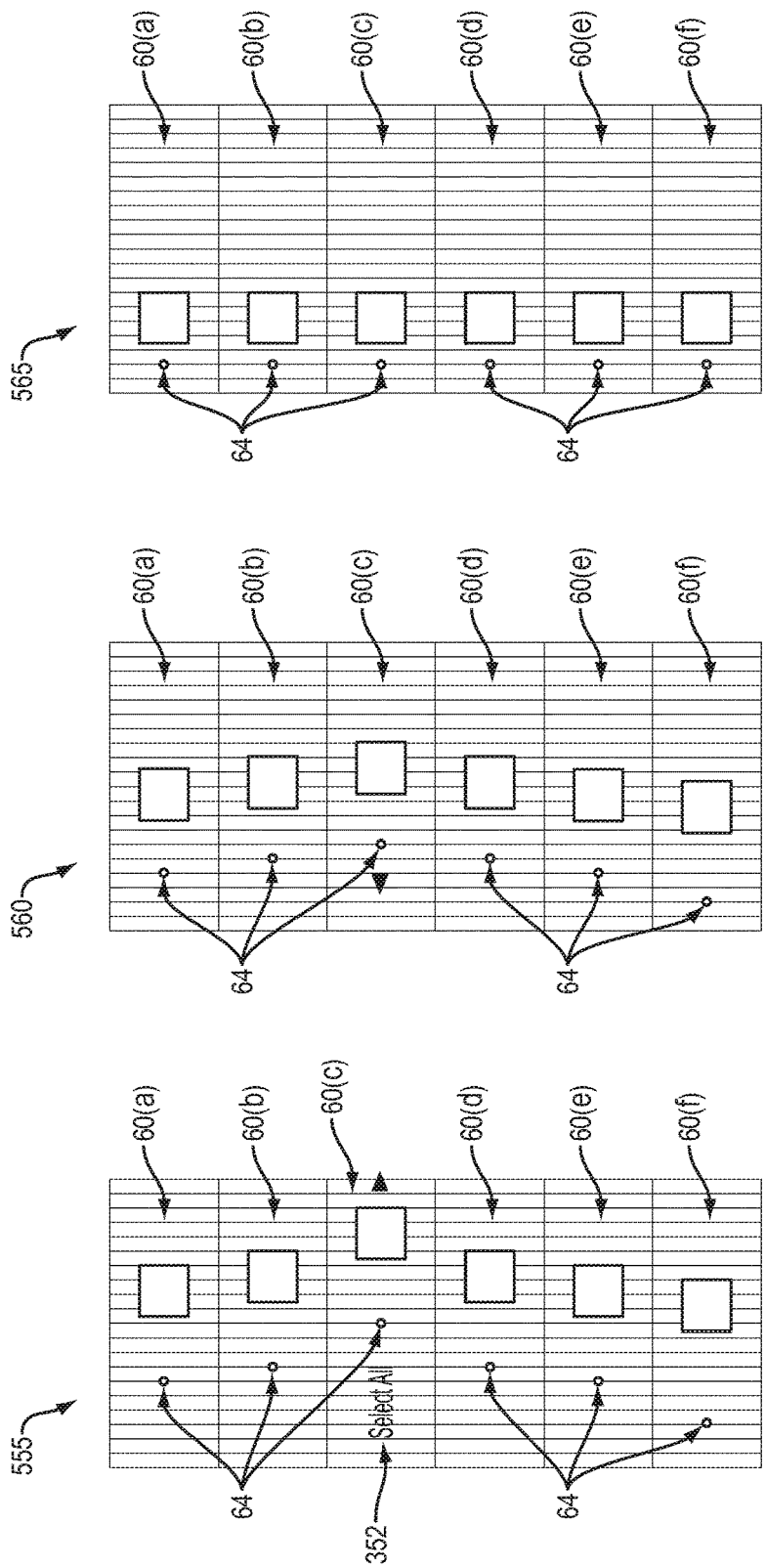

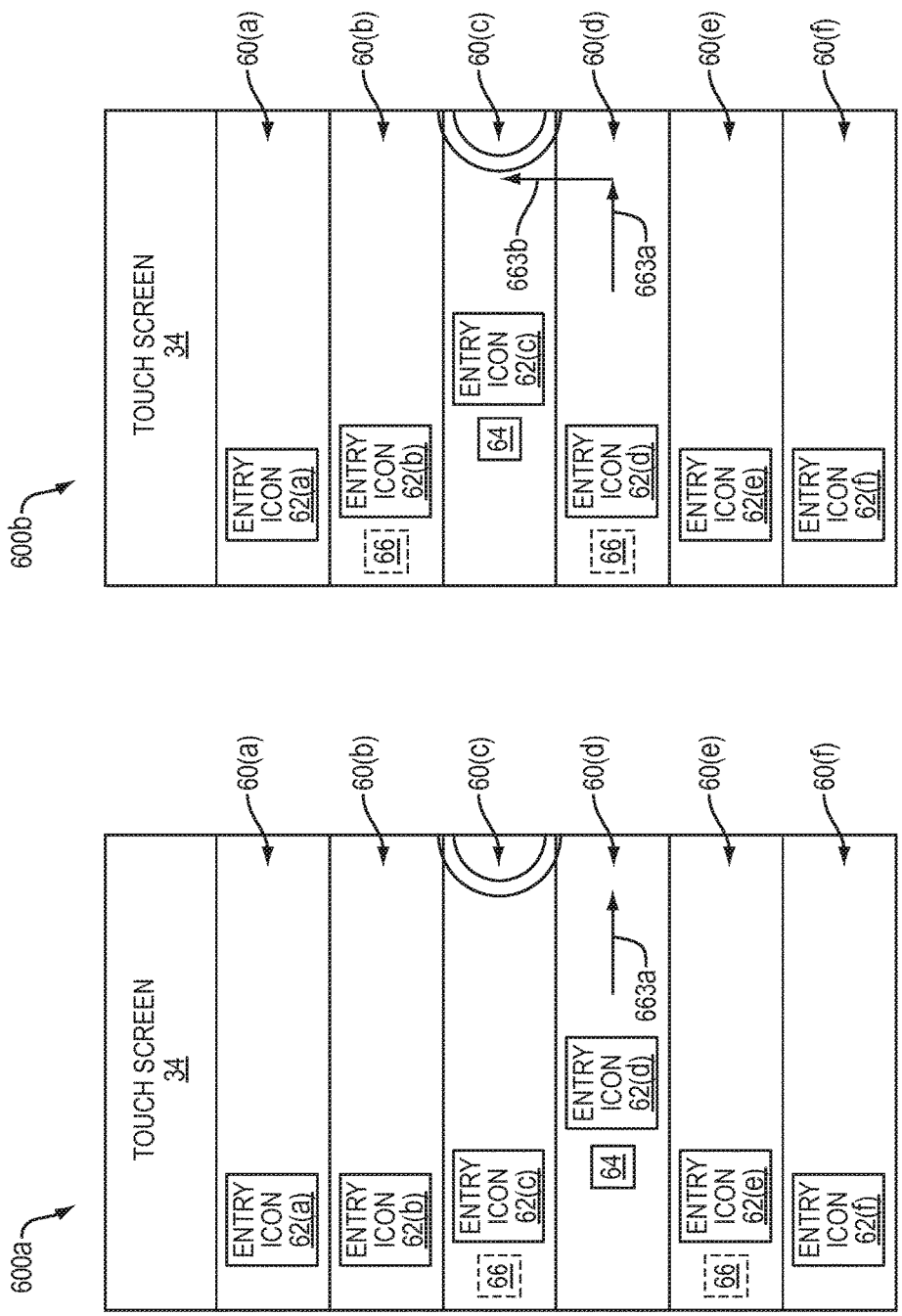

TECHNIQUES FOR SELECTING LIST ITEMS USING A SWIPING GESTURE

RELATED APPLICATIONS

This application claims priority to Provisional U.S. Patent Application No. 61/987,220, entitled "TECHNIQUES FOR SELECTING LIST ITEMS USING A SWIPING GESTURE," filed on May 1, 2014, the contents and teachings of which are hereby incorporated herein in their entirety by this reference. This application claims priority to Provisional U.S. Patent Application No. 61/931,210, entitled "GESTURE MENU," filed on Jan. 24, 2014, the contents and teachings of which are hereby incorporated herein in their entirety by this reference.

BACKGROUND

Many mobile devices, such as smart phones and tablets, include a touchscreen that allows a user to operate applications by touching and swiping the touchscreen. When a list of items is displayed on the touchscreen, a particular item may be selected by tapping on the item. In some systems, in order to select multiple items, a selection mode may be initiated to allow the user to tap on several items in succession without immediately initiating any action with respect to a tapped item.

SUMMARY

Unfortunately, the above-described conventional systems suffer from deficiencies. For example, if the user wants to select several items without proceeding to a menu, it may require several taps to do so, even if the desired items are adjacent to each other.

Thus, it would be desirable to allow the user to easily select several adjacent items with a swipe that does not require the user to tap the screen multiple times. In contrast to the above-described approaches, this disclosure relates to a user interface for a small handheld touchscreen device in which a user is able to select or deselect list items via a convenient swiping motion using a touch screen. This swiping motion can also be used to select multiple items with a single swiping motion, allowing the user to easily select multiple adjacent list items without lifting his finger from the screen.

One embodiment of the improved techniques is directed to a method performed by a computing device of selecting one or more items from a list displayed on a touch screen of the computing device. The method includes (a) receiving a touch command from the touch screen indicating that a user has begun swiping an item of the list displayed on the touch screen using an appendage, (b) in response to receiving the touch command, indicating tentative selection of the item by (1) causing the displayed item to slide in a direction of the swiping on the touch screen and (2) displaying a tentative selection marker adjacent to the displayed item, (c) receiving a continuing touch command from the touch screen indicating that the user has continued to swipe the displayed item on the touch screen past a first threshold using the appendage, (d) in response to receiving the continuing touch command, indicating that the item has been set to be selected by (1) causing the displayed item to slide further in the direction of the swiping on the touch screen and (2) displaying a non-tentative selection marker adjacent to the displayed item in lieu of the tentative selection marker, (e) receiving a termination signal from the touch screen indicating that the user has terminated the swiping, and, in response, selecting all items from the list that have been set to be selected, and (f) performing an action on the selected items. Other embodiments are directed to a system, a computerized apparatus, and a computer program product for performing methods similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIGS. 3A-3D depict a sequence of example screens of a graphical user interface according to various embodiments for selecting an item with a swiping operation.

FIGS. 4A-4G depict a sequence of example screens of a graphical user interface according to various embodiments for selecting several items with a swiping operation.

FIGS. 5A-5C depict a sequence of example screens of a graphical user interface according to various embodiments for reversing a swipe to deselect items already selected earlier in the swipe.

FIGS. 7A-7B depicts a sequence of example screens of a graphical user interface according to various embodiments for modifying selection of items by swiping orthogonally.

DETAILED DESCRIPTION

This disclosure relates to a user interface for a small handheld touchscreen device in which a user is able to select or deselect list items via a convenient swiping motion using a touch screen. This swiping motion can also be used to select multiple items with a single swiping motion, allowing the user to easily select multiple adjacent list items without lifting his finger from the screen.

Figure 1:
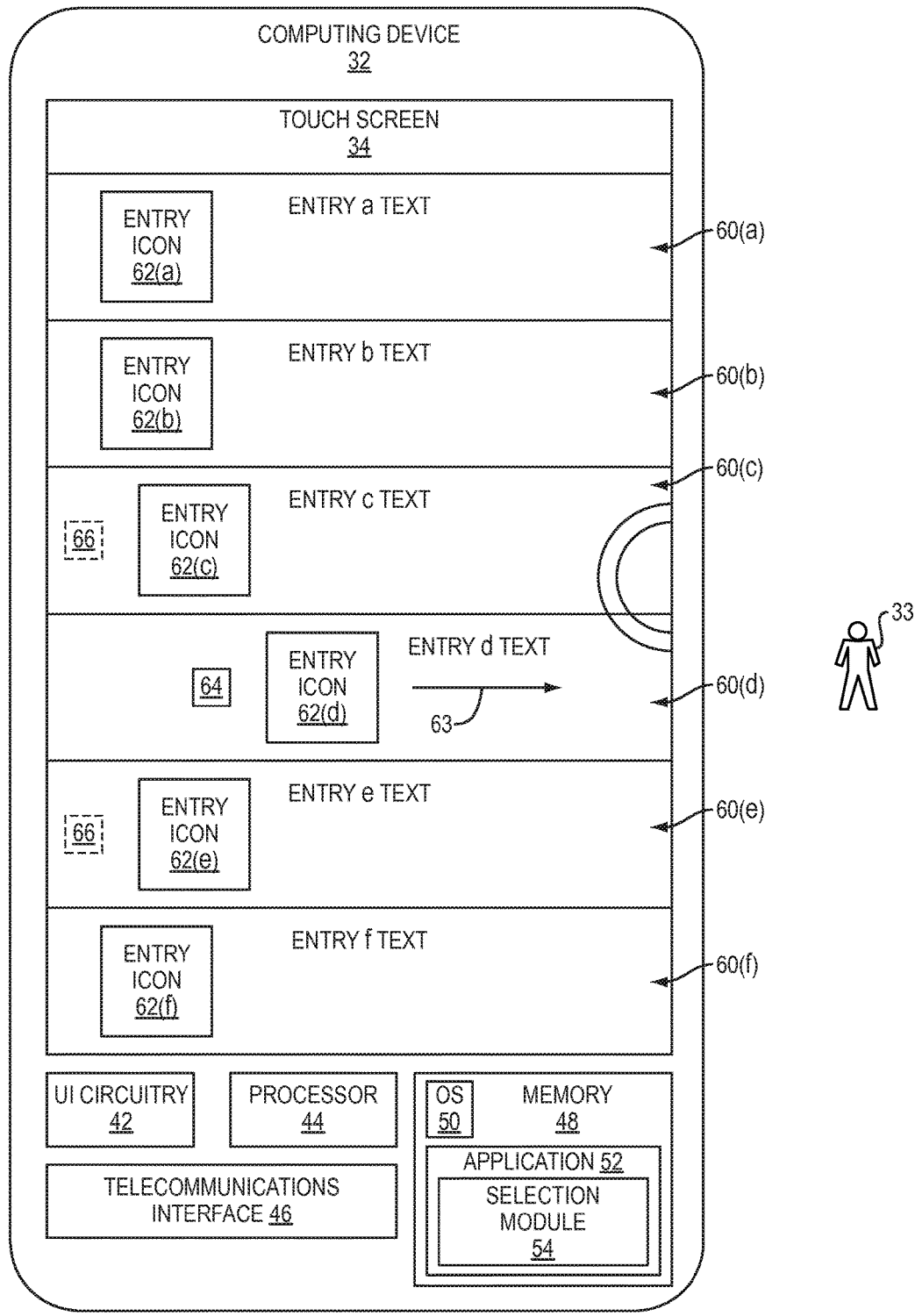
FIG. 1 is a block diagram depicting an example computing device according to various embodiments.

FIG. 1 depicts an example computing device 32. Computing device 32 may be any kind of computing device, but typically will be a portable handheld computing device such as a smart phone, a tablet computer, a laptop computer, or a similar device. Computing device 32 includes a touch screen 34, which is a display screen that displays a graphical user interface to a user 33 and is capable of receiving user feedback by the user 33 touching the touch screen 34 with one or more appendages (e.g., a finger, fingers, or stylus) and tapping, holding, or swiping an appendage (hereinafter referred to as a finger) across the touch screen 34. Touch screen 34 may equivalently receive feedback from the user 33 via other means, e.g., tapping, holding, or swiping of a stylus or other object aside from a finger across touch screen 34. Alternatively, the user 33 may enter feedback by means of another device, such as, for example, a mouse or touchpad.

Computing device 32 also includes user interface circuitry 42 for controlling the display and input functions of the touch screen 34, a processor 44, memory 48, and, optionally, a telecommunications interface 46. Processor 44 may include any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 44 is made up of tangible hardware. Telecommunications interface 46 may include a cellular modem and/or any kind of wireless data transceiver device or a wired data transceiver device.

Memory 48 may be any kind of digital system memory, such as, for example, random access memory (RAM). Memory 48 stores an operating system (OS) program 50 (e.g., Linux, UNIX, Windows, Android, iOS, or a similar operating system) and applications executing on processor 44 as well as data used by those programs. Applications, when stored in non-transitory form in memory 48 or on a persistent form of storage, form a computer program product. The processor 44 running one or more of these applications thus forms a specialized circuit constructed and arranged to carry out the various processes described herein. One particular application 52 includes a menu graphical user interface (GUI) module (not depicted), which operates to allow the user to perform menu control operations with convenient gestures on the touch screen 34 in conjunction with non-menu operation of the application 52. Application 52 also includes a selection module 52 (which, in some embodiments, may operate as a sub-module of the menu GUI module) configured to allow the user 33 to select or deselect one or more list entries 60 (depicted as list entries 60(a)-60(f)) on touch screen 34 with a single swiping motion 63.

Each entry 60 includes an entry icon 62, and, in some embodiments, entry text (e.g., the name of the file represented by the entry; a summary of a document represented by a file; etc.).

The underlying application 52 is typically a list-based application that allows the user 33 to view and perform operations on objects which are displayed in a list on touch screen 34, depicted as entries 60. An example such application 52 is the ShareFile application produced by Citrix Systems, Inc. of Fort Lauderdale, Fla. and Bedford, Mass., in which the user 33 is able to share files. Thus, files and folders are typically listed as entries 60. However, in other arrangements, other kinds of objects may be listed. Other kinds of objects may include, for example, log entries within a log file; social media entries within a social media feed; e-mail messages within an e-mail inbox or other e-mail folder; etc. In other embodiments, the underlying application 52 may display entries 60 in a non-linear list format. For example, entries 60 may be displayed in a radial arrangement within a circle, each entry 60 being a slice of the circle.

When the user 33 desires to select one or more list entries 60, a particular challenge may arise due to the use of a touch screen 34 rather than a mouse with one or more buttons. In a typical mouse-based interface, the user 33 would be able to click and hold on an item and drag the cursor over other adjacent items that he wishes to select. However, this is generally not possible using a touch interface. Rather, in many touch-based systems, the user 33 may select one particular list entry 60 by tapping on that entry, at which point, a menu may be displayed for operations to perform in connection with that list entry 60 (e.g., open, delete, rename, etc.). Alternatively, to select multiple items to perform one operation on simultaneously, the user 33 may first click on an edit button, which causes a check box (not depicted) to be displayed next to each list entry 60, and then the user 33 is able to tap on the respective check box for each list entry 60 that the user 33 wishes to select (or deselect in the case of a list entry 60 which has already been selected).

Improved techniques are presented to allow the user 33 to conveniently select one or more list entries 60 using a single swiping motion 63. As depicted, swiping motion 63 is centered at entry 62(d) and pulls the entry icon 62(d) (and entry d text) to the right. A selection indicator 64 (also referred to as a non-tentative selection marker) indicates that the entry 60(d) is set to be selected upon termination of the swiping motion 63. In addition, adjacent entries 60(c), 60(e) are depicted as beginning to be pulled to the right, having pre-selection indicators 66 (also referred to as tentative selection markers), indicating that if the user 33 continues the swiping motion 63 further, the adjacent entries 60(c), 60(e) will also be set to be selected (at which point, pre-selection indicators 66 would become selection indicators 64). If the user 33 were to terminate swiping motion 63 as the point depicted, entry 60(d), which has been set to be selected, would become selected, however, adjacent entries 60(c), 60(e) would not be selected because they are still only (tentatively) pre-selected. In other embodiments, swiping motion 63 may be different. Thus, for example, swiping motion 63 could move towards the left rather than the right. In embodiments in which entries 60 are displayed in a horizontally-ordered arrangement rather than a vertically-ordered arrangement, swiping motion 63 could move up or down rather than to the right. In embodiments in which entries 60 are displayed as slices in a circle, swiping motion 63 could move radially inward or radially outward.

It should be understood that although operation is primarily described in the context of selection, operation may also relate to deselection (i.e., removal of entries 60 from a selected state into a deselected state). This is indicated throughout this Description by reference to "(de)selection."

In some embodiments, a menu activation element (MAE) (e.g., the semi-circular shape depicted on the right side of touch screen 34), is always displayed during operation of application 52. In other embodiments, the MAE is only displayed when one or more entries 60 have been selected. In yet other embodiments, the MAE is always displayed during operation of application 52, but the appearance of the MAE is modified upon one or more entries 60 becoming selected. The MAE may be used to allow the user 33 to enter a menu usable to easily perform operations on entries 60 which have been selected. This use of the MAE may be performed according to various techniques, several of which are described in Provisional Patent Application No. 61/931, 210, entitled "Gesture Menu," filed on Jan. 24, 2014.

Figure 2A:
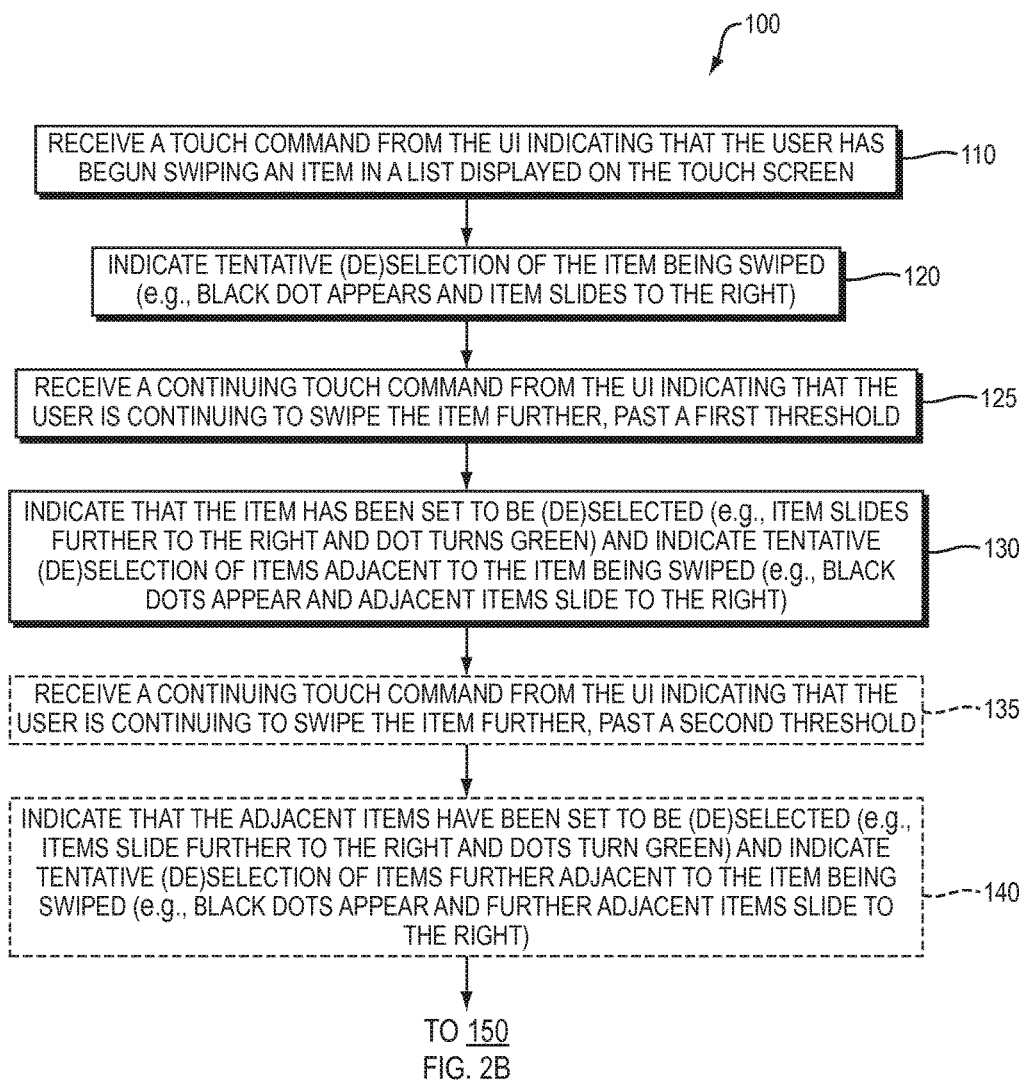
FIGS. 2A-2B depict a flowchart depicting an example method according to various embodiments.
Figure 2B:
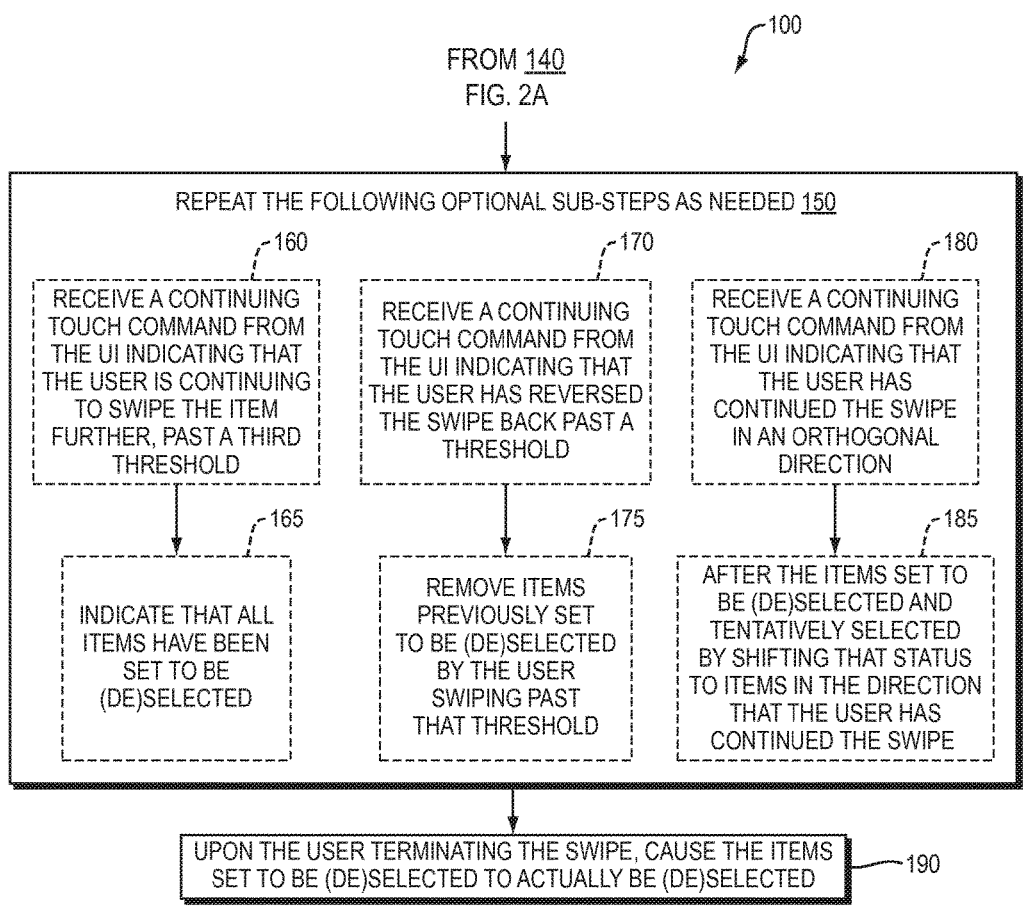

FIGS. 2A-2B depict an example method 100 performed by application 52, primarily by selection module 54. It should be understood that any time a piece of software, such as, for example, application 52 or selection module 54, is described as performing a method, process, step, or function, in actuality what is meant is that a computing device (e.g., computing device 32) on which that piece of software is running performs the method, process, step, or function when executing that piece of software on its controller (e.g., processor 44).

In step 110, selection module 54 receives a touch command from the UI circuitry 42 indicating that the user 33 has begun swiping (e.g., by swiping motion 63) an item (e.g., list entry 60(d)) in a list displayed on touch screen 34.

In step 120, in response to receiving the touch command regarding the swiping motion 63, selection module 52 indicates preliminarily tentative (de)selection of the item being swiped. For example, the list entry 60(d) is dragged to the right and pre-selection indicator 66 appears on the screen 34 to the left of entry icon 62(d).

In step 125, selection module 54 receives a continuing touch command from the UI circuitry 42 indicating that the user 33 is continuing to swipe (e.g., by continuing swiping motion 63) the item (e.g., list entry 60(*d*)) further, past a first threshold.

In step 130, in response to receiving the continuing touch command regarding the continuation of swiping motion 63, selection module 52 indicates that the list item 60(*d*) has been set to be (de)selected (e.g., by displaying selection indicator 64 in place of pre-selection indicator 66 to the left of entry icon 62(*d*) and continuing to slide the list item 60(*d*) to the right) and indicates preliminarily tentative (de)selection of items (e.g., list entries 60(*c*), 60(*e*)) adjacent to the list item 60(*d*) being swiped (e.g., by beginning to slide list entries 60(*c*), 60(*e*) to the right and displaying pre-selection indicators 66 to the left of entry icons 62(*c*), 62(*e*)).

At this point, if the user 33 releases his finger from the screen 34, operation proceeds with step 190 (see FIG. 2B), the swipe being terminated. Thus, list entry 60(*d*) would be (de)selected, with the entry icons 62 reverting to the left side of the screen 34.

If the user 33 does not yet remove his finger from the screen 34 to terminate the swipe, then operation proceeds with step 135.

In step 135, selection module 54 receives a continuing touch command from the UI circuitry 42 indicating that the user 33 is continuing to swipe (e.g., by continuing swiping motion 63) the item (e.g., list entry 60(*d*)) further, past a second threshold.

In step 140, in response to receiving the continuing touch command regarding the continuation of swiping motion 63 from step 135, selection module 52 indicates that the adjacent list entries 60(*c*), 60(*e*) have been set to be (de)selected (e.g., by displaying selection indicators 64 in place of pre-selection indicators 66 to the left of entry icons 62(*c*), 62(*e*) and continuing to slide the adjacent list items 60(*c*), 60(*e*) to the right) and indicates preliminarily tentative (de)selection of items (e.g., list entries 60(*b*), 60(*f*)) further adjacent to the list item 60(*d*) being swiped (e.g., by beginning to slide list entries 60(*b*), 60(*f*) to the right and displaying pre-selection indicators 66 to the left of entry icons 62(*b*), 62(*f*)). It should be understood that, in some embodiments, (a) the setting of the adjacent list entries 60(*c*), 60(*e*) to be (de)selected and (b) the preliminarily tentative (de)selection of the further adjacent list entries 60(*b*), 60(*f*) may each occur upon the swiping motion 63 passing separate thresholds rather than a single unified second threshold for both (a) and (b). In some such embodiments the threshold for (a) precedes the threshold for (b), while in other such embodiments, the threshold for (b) precedes the threshold for (a).

At this point, operation may continue with step 190 if the user 33 releases his finger from the screen 34. Thus, list entries 60(*c*), 60(*d*), 60(*e*) would be (de)selected with their respective entry icons 62(*c*), 62(*d*), 62(*e*) reverting to the left side of the screen 34, the selection indicators 64 remaining to the left of those entry icons 62(*c*), 62(*d*), 62(*e*). However, the list items 62(*b*), 62(*f*) that were only preliminarily tentatively (de)selected revert to the left side of the screen 34 without the pre-selection indicators 66 remaining.

If the user 33 does not yet remove his finger from the screen 34 to terminate the swipe, then operation proceeds with step 150.

Step 150 may include one or more sequences of sub-steps 160-165, 170-175, and/or 180-185.

In sub-step 160, the selection module 54 receives a continuing touch command from the UI circuitry 42 indicating that the user 33 is continuing to swipe (e.g., by continuing swiping motion 63) the item (e.g., list entry 60(*d*)) further, past a third threshold.

In sub-step 165, in response to receiving the continuing touch command regarding the continuation of swiping motion 63 from step 160, selection module 52 indicates that all list items 60 (including all list items 60(*a*)-60(*f*) displayed on screen 34 as well as any other list items 60 within the list that are off the screen) have been set to be (de)selected. In one embodiment, a "Select All" indicator is displayed on the left side of the screen 34, indicating that all list items 60 in the list have been set to be (de)selected.

In sub-step 170, the selection module 54 receives a continuing touch command from the UI circuitry 42 indicating that the user 33 has reversed the direction of the swiping motion 63 (e.g., reversed from swiping right to swiping left) back past a threshold that was previously past.

In sub-step 175, in response to receiving the continuing touch command involving the reversal of direction of swiping motion 63 from step 170, selection module 52 removes items which were previously (de)selected upon originally passing that threshold. Thus, for example, upon passing the second threshold in the reverse direction, the (de)selection of the adjacent list entries 60(*c*), 60(*e*) is removed (e.g., by displaying pre-selection indicators 66 in place of selection indicators 64 to the left of entry icons 62(*c*), 62(*e*) and sliding the adjacent list items 60(*c*), 60(*e*) to the left) and the preliminarily tentative (de)selection of list entries 60(*b*), 60(*f*) further adjacent to the list item 60(*d*) being swiped is undone (e.g., by sliding list entries 60(*b*), 60(*f*) back all the way to the left and removing pre-selection indicators 66 to the left of entry icons 62(*b*), 62(*f*)).

In sub-step 180, the selection module 54 receives a continuing touch command from the UI circuitry 42 indicating that the user 33 has continued the swiping motion 63 in a substantially orthogonal direction), meaning that a typical user 33 would perceive these directions as being orthogonal (e.g., within 5 degrees or 10 degrees of 90 degrees). For example, as depicted in FIG. 7A, in an initial state 600*a*, the user 33 has swiped in a swiping motion 663*a*, swiping list entry 60(*d*) to the right, having set list entry 60(*d*) to be (de)selected and adjacent list entries 60(*c*), 60(*e*) to be tentatively (de)selected. Then, in a next state 600*b* depicted in FIG. 7B, the user 33 changes the swipe direction by following swiping motion 663*a* with an orthogonal swiping motion 663*b* in an upwards direction rather than the rightward direction of swiping motion 663*a*.

In sub-step 185, in response to receiving the continuing touch command involving the orthogonal change of direction of swiping motion 63 from step 180, selection module 52 alters the list items 60 set to be (de)selected (and those tentatively (de)selected) shifting that status to items in the direction that the user 33 has continued the swipe. Thus, for example, as depicted in FIG. 7B, upon the user 33 continuing the swiping motion with orthogonal swiping motion 663*b*, instead of list item 60(*d*) being (de)selected, the next list item 60(*c*) above that list item 60(*d*) (since the direction of the orthogonal swiping motion 663*b* is upwards) becomes set to be (de)selected in place of list item 60(*d*). Similarly, instead of list items 60(*c*), 60(*e*) being tentatively selected, list items 60(*b*), 60(*d*) become tentatively selected in their place. If the user 33 were to continue the orthogonal swiping motion 663*b* even further upwards, the status of the list items 60 would continue to shift upwards. Similarly, if the orthogonal swiping motion 663*b* were downwards rather than upwards (not depicted), list item 60(*e*) would become set to be (de)selected instead of list item 60(d) and list items 60(d), 60(f) would become tentatively selected instead of list items 60(c), 60(e).

It should be understood that, in some cases, sub-steps 180-185 may proceed directly after step 130, without steps 135-140 intervening.

At this point, once the user 33 has finished the swiping motion 63 by lifting his finger from the screen 34, operation proceeds to step 190, in which selection module 54 causes the items 60 which are set to be (de)selected to actually become (de)selected.

FIGS. 3-6 present various example display sequences on screen 34 resulting from various use cases.

FIGS. 3A-3D represent an example use case in which the user 33 swipes to the right to select a single list entry 60.

FIG. 3A depicts an example initial screen layout 210 of touch screen 34 in which the list entries 60 (depicted as entries 60(a), 60(b), . . . , 60(f)) are file and folders. The folders include a picture of a folder as their respective entry icons 62 (e.g., folders 62(a), 62(b)), while the files include file-type specific entry icons 62 (e.g., a "P" in a white square 62(c) for a PowerPoint presentation, a "W" in a white square 62(d) for a Word document, an "X" in a white square 62(e) for an Excel spreadsheet, and "JPG" in a white square 62(f) for a JPEG image). Each entry 60 has entry text including the filename (or folder name in the case of a folder) and size of the file or folder. In the case of a folder, the entry text also includes the number of files within the folder.

FIG. 3B depicts an example continuing screen layout 220 of touch screen 34 in which the user 33 is beginning to swipe the second folder 60(b) in the list to the right (steps 110-120). The picture of the hand 212 represents the hand of the user 33 touching the screen 34 with a finger at a location represented by the small circle at the fingertip, forming a cursor. As depicted, the folder 60(b) entitled "Goonies" is beginning to be swiped to the right, however, the swiping motion 63 has only just begun, so a pre-selection indicator 66 is depicted (as a black dot, although, in other embodiments, other depictions are possible, such as, for example, a dot of another color or a particular shape with a particular color or shading pattern).

FIG. 3C depicts an example continuing screen layout 230 in which the user 33 has swiped slightly further to the right, causing the "Goonies" folder 60(b) to become set to be selected (steps 125-130). This is represented by the pre-selection indicator 66 turning into a selection indicator 64 (depicted as a white dot, although, in other embodiments, other depictions are possible, such as, for example, a dot of another color or a particular shape with a particular color or shading pattern, so long as the color or shading pattern is different than for the pre-selection indicator 66).

Finally FIG. 3D depicts an example continuing screen layout 240 in which the user 33 has removed his finger from the screen 34, terminating the swiping motion 63 (step 190). Because the "Goonies" folder 60(b) had already been set to be selected prior to the termination of the swiping motion 63, the "Goonies" folder 60(b) now becomes selected, the selection indicator 64 and the remainder of the list entry 60(b) snapping back to the left of the touch screen 34.

FIGS. 4A-4G represent another example use case in which the user 33 swipes to the right to select multiple list entries 60.

FIG. 4A depicts another example screen layout 310 of touch screen 34 in which the user 33 has begun to swipe the third entry 60(c) (which is the first file that is not a folder) in the list to the right (steps 110-120). As depicted, the file 60(c) entitled "Goonies_2.pptx" is beginning to be swiped to the right, however, the swiping motion 63 has only just begun, so a pre-selection indicator 66 is depicted.

FIG. 4B depicts an example continuing screen layout 320 in which the user 33 has swiped slightly further to the right, past the first threshold, causing the "Goonies_2.pptx" file 60(c) to become set to be selected (steps 125-130). This is represented by the pre-selection indicator 66 turning into a selection indicator 64 for that file 60(c). In addition, the adjacent list entries 60 (i.e., the "Goonies" folder 60(b) and the "Presentation_Outline.docx" file 60(d)) have begun to become preliminarily tentatively selected, those adjacent list entries 60(b), 60(d) beginning to slide to the right, and pre-selection indicators 66 appearing in conjunction with those adjacent list entries 60(b), 60(d).

FIG. 4C depicts an example continuing screen layout 330 in which the user 33 has swiped slightly further to the right so that further adjacent list entries (i.e., the "Back to the Future" folder 60(a) and the "Project Grid.xslx" file 60(e)) have become preliminarily tentatively selected, those further adjacent list entries 60(a), 60(e) beginning to slide to the right, and pre-selection indicators 66 appearing in conjunction with those further adjacent list entries 60(a), 60(e). In addition, the adjacent list entries 60(b), 60(d) ("Goonies" and "Presentation_Outline.docx") have slid further to the right, but have not yet slid far enough to become set to be selected.

FIG. 4D depicts an example continuing screen layout 340. Upon the user 33 having swiped slightly further to the right, a yet further adjacent list entry 60(f) (i.e., the "Texture_B-G.jpg" file) has become preliminarily tentatively selected, that yet further adjacent list entry 60(f) beginning to slide to the right, and pre-selection indicator 66 appearing in conjunction with that yet further adjacent list entry 60(f). In addition, the adjacent list entries 60(b), 60(d) ("Goonies" and "Presentation_Outline.docx") have slid further to the right, now having slid far enough to become set to be selected, the pre-selection indicators 66 turning into selection indicators 64 for those adjacent entries 60(b), 60(d). The further adjacent list entries 60(a), 60(e) ("Back to the Future" and "Project Grid.xslx") have slid further to the right, but have not yet slid far enough to become set to be selected.

As depicted in FIGS. 4C-4D, the second threshold actually has two sub-thresholds, the further adjacent list entries 60(a), 60(e) ("Back to the Future" and "Project Grid.xslx") having become preliminarily tentatively selected in FIG. 4C prior to the adjacent list entries 60(b), 60(d) ("Goonies" and "Presentation_Outline.docx") becoming set to be selected in FIG. 4D. Thus, together, FIGS. 4C-4D represent steps 135-140.

FIG. 4E depicts an example continuing screen layout 350. Upon the user 33 having swiped slightly further to the right, past the third threshold, a "Select All" indicator 352 appears, indicating that all list entries 60 in the list, including list entries 60 that are not shown on the touch screen 34 (e.g., because there are too many folders and files at this level of a directory hierarchy to fit on the touch screen 34) have been set to be selected (sub-steps 160-165).

Figure 4G:
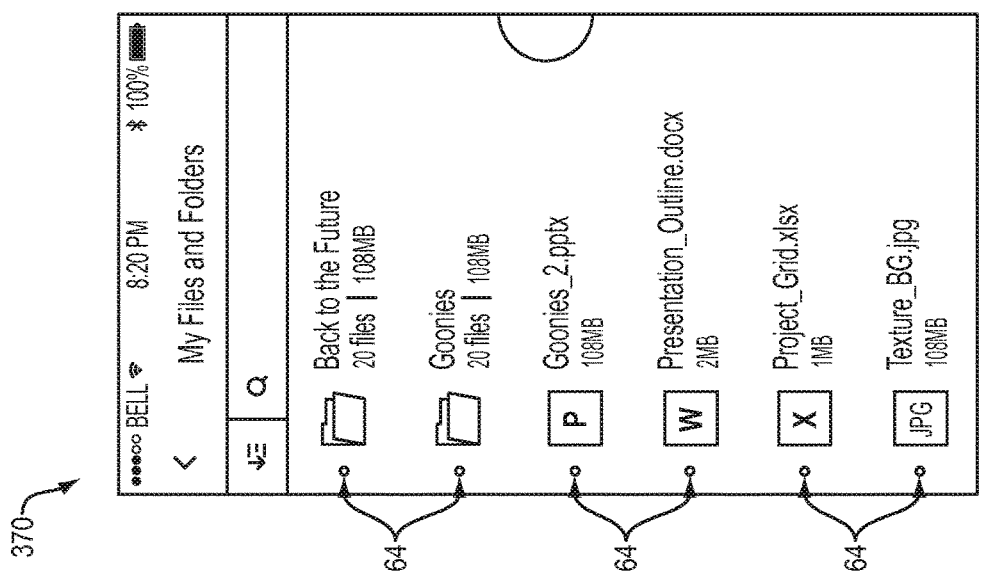

In example continuing screen layouts 360, 370 of FIGS. 4F-4G (step 190), the user 33 has terminated the swiping motion 63, and the list entries 60 that have been set to be selected (i.e., in this case, ALL list entries in the list) become selected, snapping back to the left.

Figure 5C:
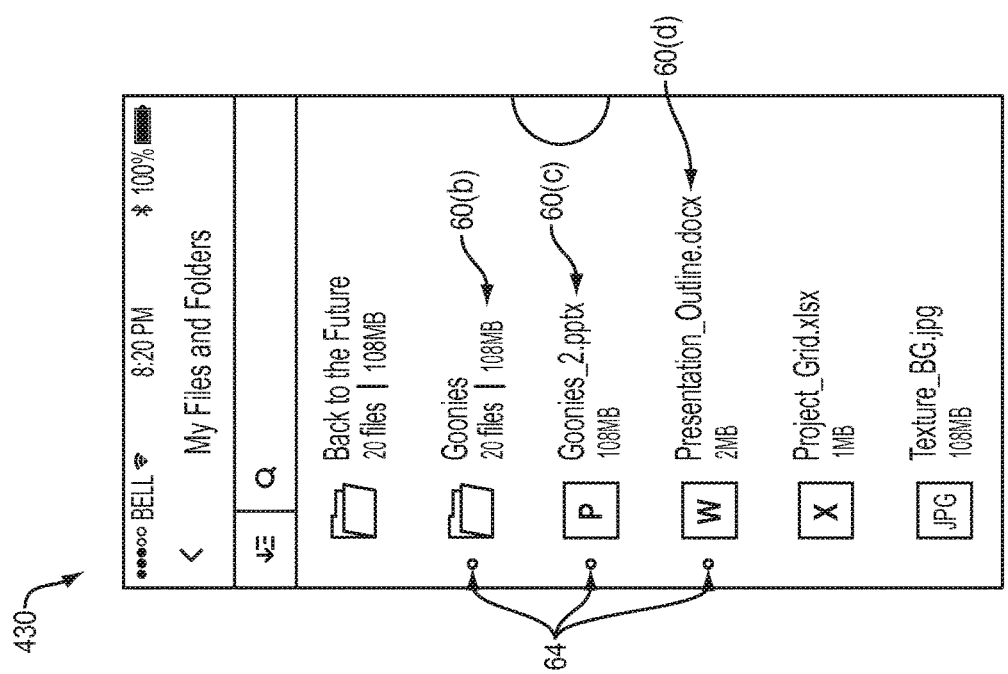

FIGS. 5A-5C represent yet another example use case. In this use case, the user 33 reverses the swiping motion 63 to undo a previous (de)selection operation.

FIG. 5A depicts another example screen layout 410 of touch screen 34, similar to the state of layout 350 in FIG. 4E. Thus, layout 410 represents a state after the user 33 has swept past the third threshold, all list entries 60 in the list having been set to be selected. However, as depicted in example screen layout 420 of FIG. 5B, the user 33 has reversed the direction of swiping motion 63 back past the third threshold (sub-step 170). Based on the distance that the user 33 has reversed, only three list entries 60(b), 60(c), 60(d) ("Goonies," "Goonies_2.pptx," and "Presentation_Outline.docx") remain set to be selected, the remaining list entries 60(a), 60(e), 60(f) having reverted back to a pre-selected state (sub-step 175). Then, as depicted in example screen layout 430 of FIG. 5C, upon the user 33 terminating the swiping motion 63, the three the list entries 60(b), 60(c), 60(d) that have been set to be selected (i.e., in this case, "Goonies," "Goonies_2.pptx," and "Presentation_Outline.docx") become selected, snapping back to the left.

Figure 6C:
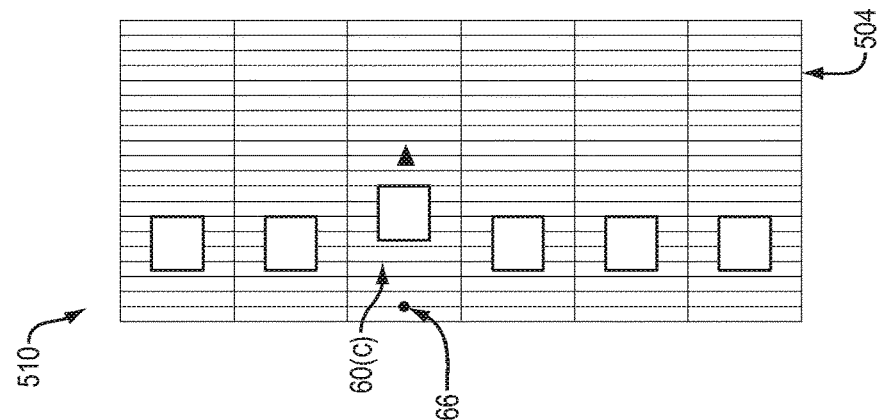
FIGS. 6A-6N depict a sequence of example screens of a graphical user interface according to various embodiments for selecting items.
Figure 6B:
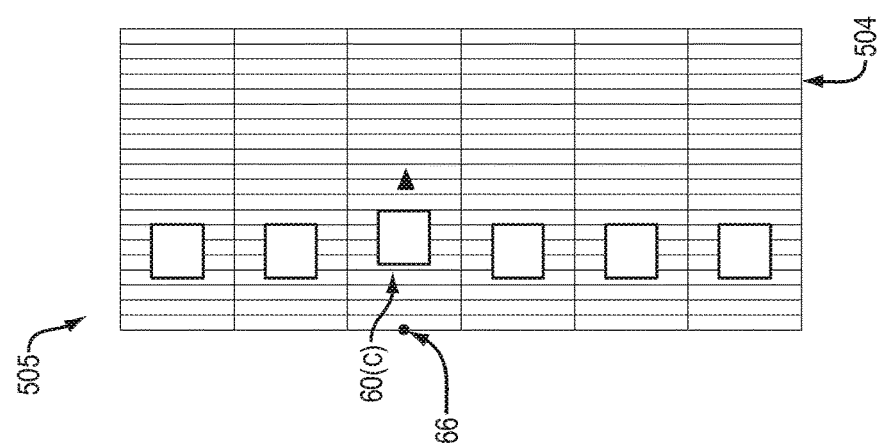
Figure 6A:
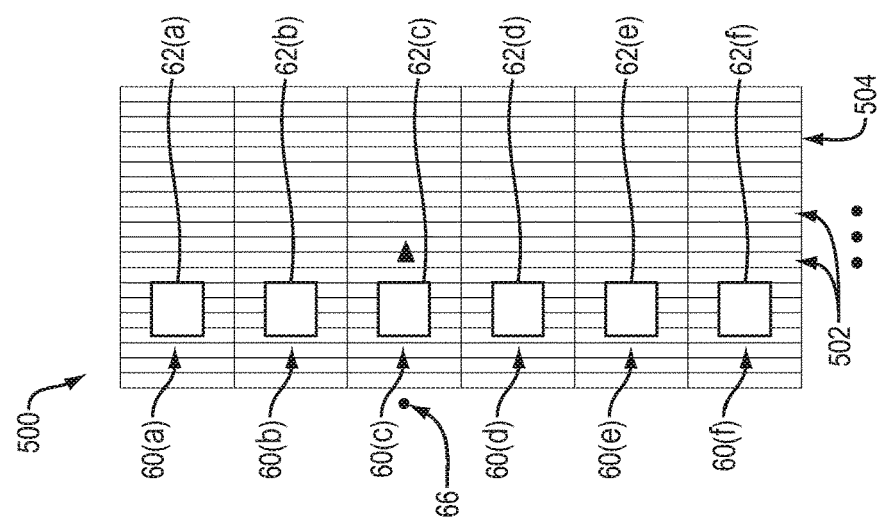

FIGS. 6A-6N represent an alternate view of an example use case in which the user 33 swipes a list entry 60(c) past all three thresholds and then reverses the direction of the swiping motion. As depicted in FIGS. 6A-6N, the touch screen 34 is divided up in to a collection of cells 502 in a grid arrangement 504. Each cell 502 is 20 pixels wide, although this is by way of example only. Each cell 502 is as tall as a list entry 60. Only the entry icon 62 is shown for each list entry 60.

FIG. 6A depicts an example screen layout 500 in which the user 33 has touched the touch screen 34 to swipe a particular list entry 60 (i.e., the third list entry 60(c) from the top) but had not yet begun the swiping motion 63. At this point, a pre-selection indicator 66 (depicted as a black dot) may logically be placed just off the screen 34 to the left of the list entry 60(c). In example screen layout 505 of FIG. 6B, once the list entry 60(c) is swiped just a small distance (as depicted, one block of 20 pixels) to the right (step 110), the pre-selection indicator 66 is dragged onto the screen 34 (step 120).

In example screen layout 510 of FIG. 6C, the list entry 60(c) is swiped an additional 20 pixels past where it was in FIG. 6B, and, in example screen layout 515 of FIG. 6D, the list entry 60(c) is swiped an additional 20 pixels just barely past the first threshold (step 125).

In example screen layout 520 of FIG. 6E, since the first threshold has been passed, the pre-selection indicator 66 for list entry 60(c) becomes a selection indicator 64 (depicted as a white dot) and the adjacent list entries 60(b), 60(d) begin to move right, displaying respective pre-selection indicators 66 just barely on the screen 34 (step 130).

FIGS. 6F-6H depict example screen layouts 525, 530, 535 in which the user 33 swipes the list entry 60(c) to the right an additional 20 pixels each, together representing steps 135-140. As depicted in FIGS. 6F-6H, the second threshold actually has two sub-thresholds, the further adjacent list entries 60(a), 60(e) becoming preliminarily tentatively selected in FIG. 6F (and the yet further adjacent list entry 60(f) becoming preliminarily tentatively selected in FIG. 6G) prior to the adjacent list entries 60(b), 60(d) becoming set to be selected in FIG. 6H.

FIG. 6I depicts an example screen layout 540 in which the user 33 swipes the list entry 60(c) past another threshold, causing the further adjacent list entries 60(a), 60(e) to become set to be selected. FIG. 6J depicts an example screen layout 545 in which the user 33 swipes the list entry 60(c) past yet another threshold, causing the yet further adjacent list entry 60(f) to become set to be selected.

FIGS. 6K-6L depict example screen layouts 550, 555 in which the user 33 swipes the list entry 60(c) past a third threshold to the right an additional 20 pixels each, together representing sub-steps 160-165. As depicted in FIGS. 6K-6L, the third threshold actually has two sub-thresholds. In a first step (see FIG. 6K), upon passing a first sub-threshold of the third threshold, the "Select All" indicator appears in black, indicating pre-selection of all list entries 60 in the list. Only after a second step of the swiping motion 63 continuing past a second sub-threshold of the third threshold (FIG. 6L) does the "Select All" indicator turn green, indicating that all list entries 60 in the list have been set to be (de)selected.

FIG. 6M depicts an example screen layout 560 in which the user 33 has reversed the swiping motion 63 back past the third threshold, reversing the selection of all list entries 60 in the list (sub-steps 170-175). Thus, although all of the list entries 60(a)-60(f) on the screen remain selected, additional list entries 60 which are not on the screen no longer remain selected.

Finally, FIG. 6N depicts an example screen layout 565 in which the user 33 has removed his finger from the screen 34, terminating the swiping motion 63 (step 190). Thus, all of the list entries 60 that have been set to be selected (i.e., in this case, all list entries 60(a)-60(f) on the screen 34) become selected, snapping back to the left together with their respective selection indicators 64.

Thus, techniques have been disclosed for allowing the user 33 to operate a handheld touch-based device 32 to select or deselect list entries 60 via a convenient swiping motion 63 using a touch screen 34. This swiping motion 63 can also be used to select multiple items with a single swiping motion 63, allowing the user 33 to easily select multiple adjacent list items 60 without lifting his finger from the screen 34.

While various embodiments of the present disclosure have been particularly shown and described, it will be understood by those skilled in the art that various changes in form and details may be made therein without departing from the spirit and scope of the present disclosure.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

In addition, the term "touch" can refer to touching with a finger or any other manner of activating touch screen 34, e.g., using a stylus, or, in some embodiments, hovering a finger or stylus just off the screen, as is well-known in the art. Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method, performed by a computing device of selecting one or more items from a list displayed on a touch screen of the computing device, the method comprising:
receiving a touch command from the touch screen indicating that a user has begun swiping an item of the list displayed on the touch screen using an appendage;
in response to receiving the touch command, indicating tentative selection of the item by:
causing the displayed item to slide in a direction of the swiping on the touch screen, and
displaying a tentative selection marker adjacent to the displayed item;
receiving a continuing touch command from the touch screen indicating that the user has continued to swipe the displayed item on the touch screen past a first threshold using the appendage;
in response to receiving the continuing touch command, indicating that the item has been set to be selected by:
causing the displayed item to slide further in the direction of the swiping on the touch screen and displaying a non-tentative selection marker adjacent to the displayed item in lieu of the tentative selection marker, and
indicating tentative selection of items displayed adjacent to the item by:
causing the adjacent items to slide in the direction of the swiping on the touch screen and
displaying the tentative selection marker adjacent to the adjacent items;
receiving a termination signal from the touch screen indicating that the user has terminated the swiping, and, in response, selecting all items from the list that have been set to be selected; and
performing an action on the selected items.

2. The method of claim 1 wherein the method further comprises:
receiving a further continuing touch command from the touch screen indicating that the user has continued to swipe the displayed item on the touch screen past a second threshold using the appendage;
in response to receiving the further continuing touch command, indicating that the adjacent items have been set to be selected by:
causing the adjacent items to slide further in the direction of the swiping on the touch screen, and
displaying the non-tentative selection marker adjacent to the adjacent items in lieu of the tentative selection marker.

3. The method of claim 2 wherein the method further comprises, in response to receiving the further continuing touch command, also indicating tentative selection of items displayed adjacent to the adjacent items, exclusive of the item itself, hereinafter "further adjacent items," by:
causing the further adjacent items to slide in the direction of the swiping on the touch screen; and
displaying the tentative selection marker adjacent to the further adjacent items.

4. The method of claim 3 wherein the method further comprises:
receiving a yet further continuing touch command from the touch screen indicating that the user has continued to swipe the displayed item on the touch screen past a third threshold using the appendage;
in response to receiving the yet further continuing touch command, indicating that the all items from the list have been set to be selected by displaying the non-tentative selection marker adjacent to all items of the list.

5. The method of claim 4 wherein the method further comprises:
receiving a reverse touch command from the touch screen indicating that the user has reversed direction of the swiping to swipe the displayed item on the touch screen back past the third threshold in a reverse direction using the appendage; and
in response to receiving the reverse touch command:
revoking the setting of items previously set to be selected in response to the yet further continuing touch command, and
indicating tentative selection of the further adjacent items.

6. The method of claim 2 wherein the method further comprises:
receiving a reverse touch command from the touch screen indicating that the user has reversed direction of the swiping to swipe the displayed item on the touch screen back past the second threshold in a reverse direction using the appendage; and
in response to receiving the reverse touch command:
revoking the setting of the adjacent items previously set to be selected in response to the further continuing touch command, and
indicating tentative selection of the adjacent items.

7. The method of claim 2 wherein:
receiving the further continuing touch command includes receiving a continued signal continuous with both the touch command and the continuing touch command, indicating that the user has continued to swipe in the direction of the swiping without having removed the appendage from the touch screen since beginning to swipe; and
receiving the termination signal includes receiving an indication that the user has removed the appendage from the touch screen.

8. The method of claim 1 wherein the method further comprises:
after receiving the continuing touch command and prior to receiving the termination signal, receiving an orthogonal touch command from the touch screen indicating that the user has altered direction of the swiping in an orthogonal direction using the appendage; and
in response to receiving the orthogonal touch command:
revoking the tentative selection of an adjacent item opposite from the orthogonal direction by causing that adjacent item to slide back to its original position and removing the tentative selection marker adjacent to that adjacent item,
revoking the setting of the displayed item previously set to be selected by causing the displayed item to slide partway back to its original location and indicating tentative selection of the displayed item, and
indicating that another adjacent item in the orthogonal direction from the displayed item has been set to be selected by causing the other adjacent item to slide further in the direction of the swiping on the touch screen and displaying a non-tentative selection marker adjacent to the other adjacent item in lieu of the tentative selection marker previously displayed there.

9. The method of claim 8 wherein:
receiving the orthogonal touch command includes receiving a continued signal continuous with the continuing touch command, indicating that the user has continued to swipe in the orthogonal direction after changing direction of the swiping without having removed the appendage from the touch screen since beginning to swipe; and receiving the termination signal includes receiving an indication that the user has removed the appendage from the touch screen.

10. The method of claim 1 wherein the method further comprises:

receiving a reverse touch command from the touch screen indicating that the user has reversed direction of the swiping to swipe the displayed item on the touch screen back past the first threshold in a reverse direction using the appendage; and in response to receiving the reverse touch command:
revoking the setting of the displayed item previously set to be selected in response to the continuing touch command, and
indicating tentative selection of the displayed item.

11. The method of claim 10 wherein:

receiving the reverse touch command includes receiving a continued signal continuous with the touch command, indicating that the user has continued to swipe in the reverse direction after changing direction of the swiping without having removed the appendage from the touch screen since beginning to swipe; and receiving the termination signal includes receiving an indication that the user has removed the appendage from the touch screen.

12. The method of claim 1 wherein the tentative selection marker is a first color and the non-tentative selection marker is a second color different than the first color.

13. The method of claim 1 wherein:

the items from the list are displayed parallel to each other on the touch screen, one above another; and the direction of the swiping is sideways towards a lateral side of the touch screen.

14. The method of claim 1 wherein:

the items from the list are displayed in a radial arrangement on the touch screen, the radial arrangement defining a circle having a center; and the direction of the swiping is towards the center of the circle.

15. The method of claim 1 wherein performing the action on the selected items includes displaying a menu with displayed menu selections based on the selected items.

16. The method of claim 1 wherein:

receiving the continuing touch command includes receiving a continued signal continuous with the touch command, indicating that the user has continued to swipe in the direction of the swiping without having removed the appendage from the touch screen since beginning to swipe; and receiving the termination signal includes receiving an indication that the user has removed the appendage from the touch screen.

17. A computer program product comprising a non-transitory computer-readable medium, which, stores instructions that, when executed by a computing device having a touch screen, cause the computing device to perform the following operations:

receiving a touch command from the touch screen indicating that a user has begun swiping an item of a list displayed on the touch screen using an appendage;

in response to receiving the touch command, indicating tentative selection of the item by:

causing the displayed item to slide in a direction of the swiping on the touch screen, and displaying a tentative selection marker adjacent to the displayed item;

receiving a continuing touch command from the touch screen indicating that the user has continued to swipe the displayed item on the touch screen past a first threshold using the appendage;

in response to receiving the continuing touch command, indicating that the item has been set to be selected by:

causing the displayed item to slide further in the direction of the swiping on the touch screen and displaying a non-tentative selection marker adjacent to the displayed item in lieu of the tentative selection marker, and indicating tentative selection of items displayed adjacent to the item by:

causing the adjacent items to slide in the direction of the swiping on the touch screen and displaying the tentative selection marker adjacent to the adjacent items;

receiving a termination signal from the touch screen indicating that the user has terminated the swiping, and, in response, selecting all items from the list that have been set to be selected; and performing an action on the selected items.

18. A computing device comprising:

a touchscreen;

memory; and control circuitry configured to perform the following operations:

receiving a touch command from the touch screen indicating that a user has begun swiping an item of a list displayed on the touch screen using an appendage;

in response to receiving the touch command, indicating tentative selection of the item by:

causing the displayed item to slide in a direction of the swiping on the touch screen, and displaying a tentative selection marker adjacent to the displayed item;

receiving a continuing touch command from the touch screen indicating that the user has continued to swipe the displayed item on the touch screen past a first threshold using the appendage;

in response to receiving the continuing touch command, indicating that the item has been set to be selected by:

causing the displayed item to slide further in the direction of the swiping on the touch screen and displaying a non-tentative selection marker adjacent to the displayed item in lieu of the tentative selection marker, and indicating tentative selection of items displayed adjacent to the item by:

causing the adjacent items to slide in the direction of the swiping on the touch screen and displaying the tentative selection marker adjacent to the adjacent items;

receiving a termination signal from the touch screen indicating that the user has terminated the swiping, and, in response, selecting all items from the list that have been set to be selected; and performing an action on the selected items.

* * * * *